United States Patent [19]

Donnelly

[11] Patent Number: 5,689,707

[45] Date of Patent: Nov. 18, 1997

[54] METHOD AND APPARATUS FOR DETECTING MEMORY LEAKS USING EXPIRATION EVENTS AND DEPENDENT POINTERS TO INDICATE WHEN A MEMORY ALLOCATION SHOULD BE DE-ALLOCATED

[75] Inventor: Jeffrey M. Donnelly, Holmdel, N.J.

[73] Assignee: NCR Corporation, Dayton, Ohio

[21] Appl. No.: 566,768

[22] Filed: Dec. 4, 1995

[51] Int. Cl.⁶ .......................... G06F 12/00; G06F 11/00
[52] U.S. Cl. .................. 395/622; 395/621; 395/497.01; 395/427; 395/183.18; 395/183.07
[58] Field of Search .................. 395/497.01, 497.03, 395/427, 497.02, 621, 622, 183.18, 183.07

[56] References Cited

U.S. PATENT DOCUMENTS

| | | | |
|---|---|---|---|
| 3,593,315 | 7/1971 | Patel | 340/172.5 |
| 4,660,130 | 4/1987 | Bartley et al. | 395/419 |
| 4,758,944 | 7/1988 | Bartley et al. | 395/497.02 |
| 4,775,932 | 10/1988 | Oxley et al. | 364/200 |
| 4,907,151 | 3/1990 | Bartlett et al. | 395/425 |
| 5,025,367 | 6/1991 | Gurd et al. | 364/200 |
| 5,355,483 | 10/1994 | Serlet | 395/650 |
| 5,398,334 | 3/1995 | Topka et al. | 395/600 |
| 5,408,650 | 4/1995 | Arsenault | 395/575 |
| 5,454,096 | 9/1995 | Otsuka et al. | 395/401 |
| 5,465,351 | 11/1995 | Lemmo | 395/600 |
| 5,471,604 | 11/1995 | Hasbun et al. | 395/404 |
| 5,491,808 | 2/1996 | Geist, Jr. | 395/427 |
| 5,561,785 | 10/1996 | Blandy et al. | 395/497.01 |
| 5,561,786 | 10/1996 | Morse | 395/497.01 |
| 5,579,508 | 11/1996 | Yoshizawa et al. | 395/497.03 |
| 5,590,329 | 12/1996 | Goodnow, II et al. | 395/708 |

FOREIGN PATENT DOCUMENTS

| | | |
|---|---|---|
| 0666535 | 8/1995 | European Pat. Off. . |
| WO9303435 | 2/1993 | WIPO . |

OTHER PUBLICATIONS

"Memory Allocation Monitoring Class" IBM Technical Disclosure Bulletin, vol. 37, No. 4A, Apr. 1, 1994, p. 445.

*Primary Examiner*—Thomas G. Black
*Assistant Examiner*—Jean R. Homere
*Attorney, Agent, or Firm*—Matthew J. Hodulik; Jimmy Goo

[57] ABSTRACT

The invention utilizes expiration events and dependent pointers to indicate when the corresponding memory allocation should be de-allocated. Expiration events are occurrences that indicate corresponding memory allocations should be de-allocated prior to the occurrence of the event. Dependent pointers are pointers to currently allocated blocks of computer memory. These dependent pointers indicate that the corresponding computer memory allocation should be de-allocated prior to the de-allocation of the computer memory allocation referred to by the dependent pointer. Using memory management functions, the expiration events and dependent pointers are stored in a memory allocation table along with filenames and line numbers indicating where the request was made. At given points in the program, the memory allocation table is checked for memory leaks. Specifically, the memory allocation table is checked for currently allocated blocks of computer memory which have an expired expiration event that has occurred or a dependent pointer which points to a de-allocated memory allocation.

17 Claims, 2 Drawing Sheets

METHOD AND APPARATUS FOR DETECTING MEMORY LEAKS USING EXPIRATION EVENTS AND DEPENDENT POINTERS TO INDICATE WHEN A MEMORY ALLOCATION SHOULD BE DE-ALLOCATED

BACKGROUND OF THE INVENTION

1. Field of the Invention

The present invention relates to the management of allocated computer memory, and more particularly to a method and apparatus for detecting memory leaks in a program executing on a computer system using expiration events and dependent pointers.

2. Background of the Related Art

Computer operating systems dynamically allocate memory in a computer system while executing programs, i.e., processes, to use for specific functions. Upon completion of the specific functions, however, the allocated memory is sometimes unintentionally never de-allocated leaving the allocated memory unavailable for other functions within the program to use. This undesirable allocation of computer resources is called a memory leak. As the same offending function is repeatedly executed (or as other offending functions are executed), the number of memory leaks increase causing the process to grow in size and consume more computer memory until they reach the limit of the computer system and the process abnormally terminates. There is a significant negative performance impact on the program and the computer system as the size of the process increases. Thus, it is important for programmers to detect and remove these memory leaks prior to releasing the product to customers. Prior art systems for detecting memory leaks are generally unreliable or, in some cases, difficult to implement.

A first indication of a memory leak in a program to a programmer is when it is noticed that the process is consuming excessive computer memory and has gotten very large. Mere awareness of the memory leak, however, does not necessarily translate into simple detection and removal of the memory leak. Many times a memory leak is a function in the program that is executed too infrequently during development to be noticed. However, this function may be executed enough at a customer site to cause problems after the process has been running for an extended period of time.

The prior art systems for detecting memory leaks generally consist of replacing the standard memory management functions with debugging memory management functions. Generally, these systems are either over-inclusive or under-inclusive. In other words, they either report memory leaks that do not exist or they fail to report every memory leak. One such system matches memory allocations with memory de-allocations. This system involves recording pointers to memory allocations in a list as they are allocated and removing the pointers as the memory allocations are de-allocated. Also recorded next to the memory allocations are the filenames and line numbers indicating where the request was made for the memory allocation. At given points in the program or at process termination, the list is examined for memory leaks. Specifically, any pointer remaining on the list represents a memory allocation without a corresponding memory de-allocation, which is considered a memory leak by this particular prior art system. This solution is unsatisfactory, however, particularly for large programs, since at any given point in time a program may have hundreds of perfectly valid memory allocations that are still in use but are incorrectly identified as memory leaks. Weeding out the valid memory allocations involves manually examining the list, which is often too difficult for practical use and will likely lead to programmers ignoring some memory leak warnings.

Another method in the prior art for detecting memory leaks involves checking process data space for references to dynamically allocated memory in a memory allocation table. Process data space is a storage area maintained by an operating system on behalf of the process for process data, such as variables, dynamically allocated memory and stack. A memory allocation table is a storage area maintained by the operating system on behalf of the computer system to track unused memory and dynamically allocated memory. This prior art method scans the process data space for references to dynamically allocated memory in the memory allocation table. Any dynamically allocated memory in the memory allocation table that is not referenced in the process data space is considered a memory leak. Unlike the first mentioned prior art method, this method will often fail to report every memory leak because it merely checks for a reference to the dynamically allocated memory (as denoted in the memory allocation table) in the process data space when a reference to dynamically allocated memory often exists on the stack or in de-allocated but not cleared memory.

Another method in the prior art for detecting memory leaks involves writing a program specific function that traverses the data structures of a process and records all valid pointers to memory allocations (for the data structures) in a list. This list is then compared to the memory allocation table. Any memory allocations in the memory allocation table without a match in the list is a memory leak. While somewhat effective, this solution is not practical for most programs since the function is program specific, and tracking and maintaining all known data structures and valid pointers, particularly in complex programs, is difficult. Accordingly, a need exists for an accurate and efficient method and apparatus for detecting memory leaks in a program executing on a computer system.

SUMMARY OF THE INVENTION

The present invention is directed to a method and apparatus that satisfies the need to detect memory leaks in a process in an accurate and efficient manner. The present invention method detects memory leaks in a program executing on a computer system using memory management functions and comprises the steps of: allocating a block of computer memory for a function in the program; specifying de-allocation information for the block of computer memory being allocated; storing requesting file information and de-allocation information corresponding to the function requesting the block of computer memory being allocated in a memory allocation table using the memory management functions; and querying the memory allocation table using the memory management functions for currently allocated blocks of computer memory having corresponding de-allocation events which indicate the currently allocated blocks of computer memory should have been de-allocated. The memory management functions are operative to query and maintain the memory allocation table, which is essentially a storage area for information regarding currently allocated computer memory including corresponding requesting file information and de-allocation information. The requesting file information includes filenames and line numbers indicative of the source code location where the request was made for the currently allocated blocks of computer memory.

The de-allocation information is indicative of a time when the currently allocated blocks of computer memory should be de-allocated. De-allocation information include expiration events and dependent pointers. The expiration events are occurrences that indicate when the computer memory being allocated should be de-allocated. The dependent pointers are pointers to currently allocated blocks of computer memory. These dependent pointers indicate that the corresponding currently allocated blocks of computer memory should be de-allocated before the de-allocation of the currently allocated blocks of computer memory referred to by the dependent pointers.

BRIEF DESCRIPTION OF THE DRAWINGS

For a better understanding of the present invention, reference may be had to the following description of exemplary embodiments thereof, considered in conjunction with the accompanying drawings, in which.

DETAILED DESCRIPTION

The present invention discloses a method and apparatus for detecting memory leaks in a program executing on a computer system, i.e., a process, in an accurate and efficient manner. The program includes at least one function, wherein a function is the basic programming unit of the program and comprises a named group of statements that can be called by the program and evaluated. Computer memory is allocated to the executing program for use by functions. When the functions are completed, the memory allocated for the functions are usually de-allocated. A memory leak occurs when the computer memory allocated for the function is unintentionally never de-allocated. When a memory leak occurs, the memory allocated to the function is considered lost since that memory is no longer used by the requesting function and is not available for other functions in the process to use. As with most solutions that detect memory management problems, the present invention comprises a set of debugging memory management functions. Specifically, the memory management functions of an operating system are replaced by the present invention with a set of debugging memory management functions.

For illustration purposes, the method and apparatus of the present invention will be described with respect to the computer system shown in FIG. 1 and the UNIX® operating system. However, it will be understood that the methodology described is equally applicable to other configurations of computer systems and to other operating systems.

Figure 1:
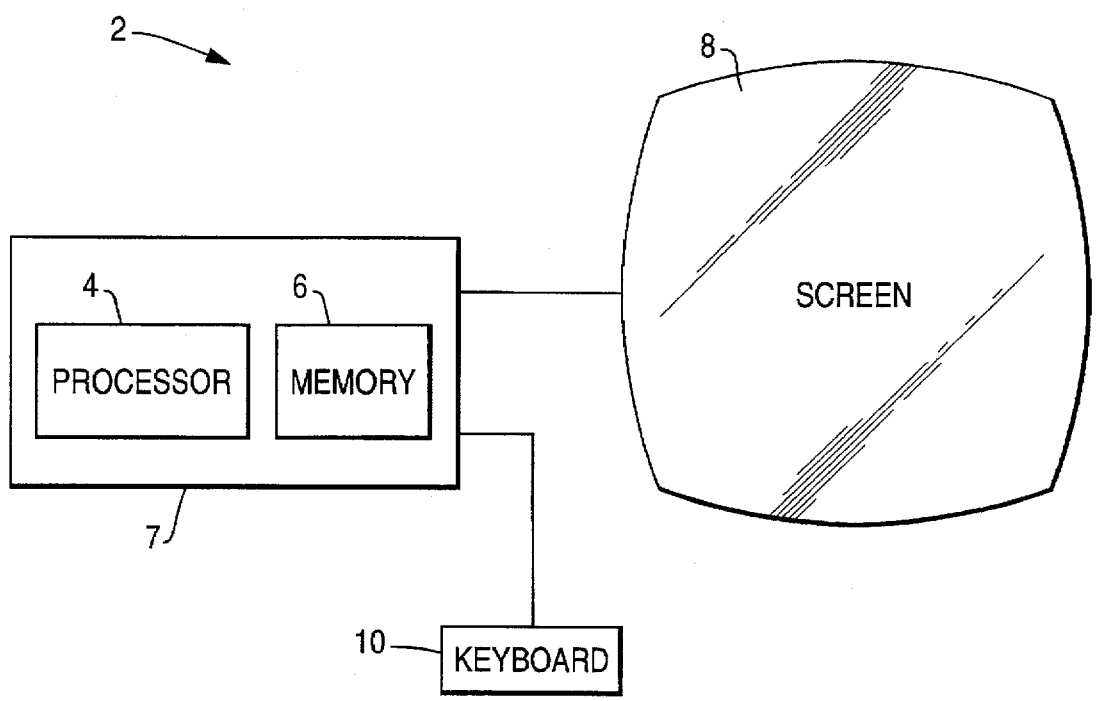
FIG. 1 depicts a memory leak detection system of the present invention.

As shown in FIG. 1, there is illustrated an exemplary embodiment of a computer system 02 within which the present invention may be implemented. The computer system 02 includes a computing unit 07, a display or video display terminal 08 and an input device 10, such as a keyboard. The computer unit 07 further includes a processor 04 and a memory 06 among other components. The memory 06 is a means for providing data storage for programs executing on the computer system 02. The display 08 and input device 10 are electrically coupled to the computer unit 07. The computer system 02 may be a workstation coupled to a central computer system (not shown) in a multi-tasking, multi-user environment, such as a local area network or client-server configuration or a stand alone system as would be understood by a person skilled in the art.

The computer unit 07, display 08 and input device 10 are collectively known as hardware, wherein the hardware is adapted to operate utilizing various software programs. Software comprises instructions that direct the manner in which the hardware is to accomplish work. Necessary for operating the computer system 02 is a type of software called an operating system. In this illustration, the operating system is UNIX. Included in the UNIX operating system is a kernel. The kernel is essentially a resident control program which manages each facet of the hardware operation including the memory 06. The kernel automatically loads into the memory 06 when the computer system 02 is booted or powered on, and remains resident in the memory 06 during the entire booted duration of the computer system 02.

All processes on the computer 02 require use of the memory 06. To manage the memory 06, the kernel includes a virtual memory manager. The virtual memory manager controls the allocation of sections of the memory 06 to each process. In paging or swapping systems, the virtual memory manager will map the memory the virtual memory manager allocates to the processes to physical memory. When physical memory is exhausted, the operating system will swap or page some of the processes to make room, as is well known in the art. Memory management functions are employed to track which parts of memory allocated by the virtual memory manager are unused, request new memory for the processes, and mark memory as unused when that memory is no longer needed by the process which requested the memory. To track each allocation and de-allocation of sections of the memory 06 to processes, the memory management functions maintain a table referred to as a "memory allocation table." The memory allocation table is basically a means for storing information such as unused memory and dynamically allocated memory including the filenames and line numbers indicating where in the source code of the program a request was made for the corresponding dynamically allocated memory. The manner in which the memory management functions maintain the memory allocation table is well known in the art.

UNIX, like many other operating systems, provides a set of memory management functions that all programs can use for dynamically allocating blocks of memory. UNIX memory management functions include functions that allocate, re-allocate and de-allocate blocks of memory. The set of debugging memory management functions of the present invention extends the memory management functions of the UNIX operating system to pass de-allocation information (in addition to the filenames and line numbers) to the memory allocation table indicating when a corresponding memory allocation should be de-allocated. The memory allocation table of the present invention is operative to store the de-allocation information.

De-allocation information includes expiration events and dependent pointers. Expiration events are occurrences that indicate when a corresponding memory allocation should be de-allocated. If the memory allocation corresponding to the expiration event is not de-allocated when the expiration event occurs, then a memory leak is present. Dependent pointers are pointers, e.g., a data element that indicates the location of other data elements, to any previously dynamically allocated memory. The memory allocation referred to by the dependent pointer is also referred to herein as a "parent memory allocation." The designation of a dependent pointer as de-allocation information indicates that the corresponding memory allocation should be de-allocated prior to the de-allocation of the parent memory allocation otherwise a memory leak is present.

Memory allocations include, but are not limited to, one or more of the following types of classifications: permanent, transient, prolonged and dependent. The relationship among each type of memory allocation and de-allocation information will be described herein. Permanent memory allocations are memory allocations that will never be de-allocated and should never be associated with a memory leak. This type of memory allocation is associated with an expiration event that will never occur. Thus, there should never be memory leaks associated with permanent memory allocations.

Transient memory allocations are memory allocations used for short durations that should be de-allocated when the function or set of functions requesting the memory allocation is complete. Prolonged memory allocations are memory allocations used for extended lengths of time but are not permanent. Like transient memory allocations, prolonged memory allocations should be de-allocated when the function or set of functions requesting the memory allocation is complete. Transient and prolonged memory allocations are associated with expiration events which are occurrences related to the operational status of a computer device or process. For example, an expiration event might be the occurrence of input by a user with a keyboard or disconnection by a client from the computer system.

In a preferred embodiment of the present invention, expiration event information is stored in the memory allocation table as unique numerical values. Each unique numerical value indicates a specific expiration event to which the memory allocation corresponds. Symbolic names can be used to refer to the numerical values. For example, the symbolic name "EVENT_NEVER" may be assigned a numerical value of "−1." The numerical value is stored in the memory allocation table to indicate that the corresponding memory allocation has an expiration event that should never occur. Similarly, the symbolic name "EVENT_INPUT" may be assigned a numerical value of "7" which indicates that the corresponding memory allocation should be de-allocated when input is provided from the keyboard.

Dependent memory allocations are memory allocations that are part of some other structure, i.e., variables that contain ordered groups of data objects, such that when those structures are no longer in use, the dependent memory allocations should be de-allocated. Dependent pointers are used by dependent memory allocations to indicate the specific memory allocation for the structure upon which the dependent memory allocation depends, i.e., parent memory allocation. All dependent memory allocation should be de-allocated prior to the de-allocation of the parent memory allocation. If the parent memory allocation is de-allocated prior to the de-allocation of the dependent memory allocations, a memory leak is present.

Figure 3:
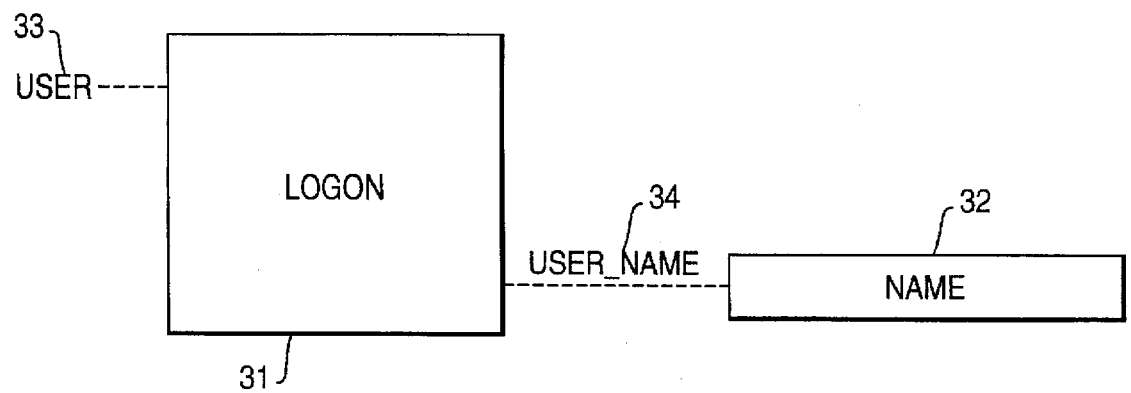
FIG. 3 depicts dependent memory allocations using a logon program as an example.

FIG. 3 illustrates the dependent memory allocations using a logon program as an example. When a user connects to a computer system, memory is allocated for a LOGON structure 31 and a NAME structure 32. A pointer USER 33 points to the memory allocation for the LOGON structure 31. The LOGON structure 31 contains many pointers, one of which is a pointer USER_NAME 34 which points to the memory allocation for the NAME structure 32. When the user disconnects from the computer system, the memory allocation for the LOGON 31 structure is de-allocated and there is no longer a reference to the memory allocation for the NAME 32 structure, i.e., pointer USER_NAME 34. This means that the pointer USER_NAME 34 is dependent upon the pointer USER 33 and that the memory allocation pointed to by USER_NAME 34 should be de-allocated prior to the de-allocation of the memory allocation pointed to by USER 33.

To specify de-allocation information, i.e., expiration event and/or dependent pointer, in the memory allocation table, the present invention introduces a debugging memory management function referred to as "memory_register()." Memory_register(pointer, expiration event, dependent pointer) specifies that previously dynamically allocated memory at location "pointer" should be associated with an "expiration event" and/or a "dependent pointer." For memory allocations that are associated only with expiration events, "NULL" is designated as the dependent pointer argument to indicate that the memory allocation is not dependent upon another structure, i.e., parent memory allocation. Likewise, memory allocations associated only with dependent pointers designate "EVENT_NONE" as the expiration event argument, wherein "EVENT_NONE" is the symbolic name for a unique numerical value indicating no expiration event is associated with the corresponding memory allocation.

One embodiment of the present invention uses the memory_register() function in conjunction with the UNIX memory management function known as malloc() to allocate memory and specify expiration events and/or dependent pointers. The UNIX malloc(size) function is utilized by the present invention to first allocate a block of memory of at least "size" bytes. If the malloc() function is successful, a pointer specifying the address of the block of dynamically allocated memory is returned as the value of the malloc() function. The memory_register() function is then used to specify the expiration event and/or dependent pointer information in the memory allocation table for the block of memory being allocated by the malloc() function. If the malloc() function is unsuccessful, a "NULL" pointer is returned. It should be understood that the memory_register() function of the present invention can also be used in conjunction with other memory management functions, such as a well-known UNIX calloc() or realloc() function.

Pseudo code for a program implementing the present invention in conjunction with the UNIX malloc() function is illustrated in example 1:

```
//example 1
01    p1=malloc(size1)
02    p2=malloc(size2)
03    memory_register(p2, EVENT_NONE, p1)
```

Lines 01 and 02 allocate blocks of "size1" and "size2" bytes of memory, respectively, and returns the memory allocation addresses to pointers "p1" and "p2," respectively. Line 03 specifies the memory allocation referred to by the pointer "p2" as depending upon the memory allocation referred to by the pointer "p1." This information is stored in the memory allocation table. Note that the symbolic name "EVENT_NONE" was used to specify that an expiration event is not associated with the memory allocation referred to by the pointer "p2."

In another embodiment of the present invention, the memory management functions of the UNIX operating system can be modified to accept expiration event and/or dependent pointer information as arguments and pass them to the memory allocation table. For example, a new function memory_malloc() is created which is identical to malloc() but is modified to include the expiration event and dependent pointer information as arguments, i.e., memory_malloc(size, expiration event, dependent pointer). With the memory_malloc() function, lines 02 and 03 of example 1 can be combined into one line. The pseudo code in example 1 may be rewritten as shown in example 2:

---

\\example 2

| 01 | p1=memory_malloc(size1, EVENT_NONE, NULL) |
| 02 | p2=memory_malloc(size2, EVENT_NONE, p1) |

--- where line 02 allocates a block of "size2" bytes of memory and specifies the memory allocation referred to by the pointer "p2" as depending upon the memory allocation referred to by the pointer "p1." The function memory_malloc can be a macro such that in production releases, i.e., non-debugging releases, the function memory_malloc() reverts to the standard malloc() call and the second and third argument are discarded.

Once the expiration event and/or dependent pointer are specified in the memory allocation table, memory leaks can be detected using debugging memory management functions of the present invention referred to as "memory_trigger()" and "free()." The memory_trigger(expiration event) function is used by a program to detect memory leaks generated from the program's failure to de-allocate memory allocations upon occurrence of a specified "expiration event." Specifically, a program uses the memory_trigger() function to indicate that the specified event has occurred and to cause the memory management functions to reference the memory allocation table for memory allocations set to expire on the specified "expiration event." In one embodiment of the present invention, the memory_trigger() function also logs as memory leaks the list of filenames and line numbers corresponding to memory allocations which should have been de-allocated upon expiration of the specified expiration event.

Figure 2:
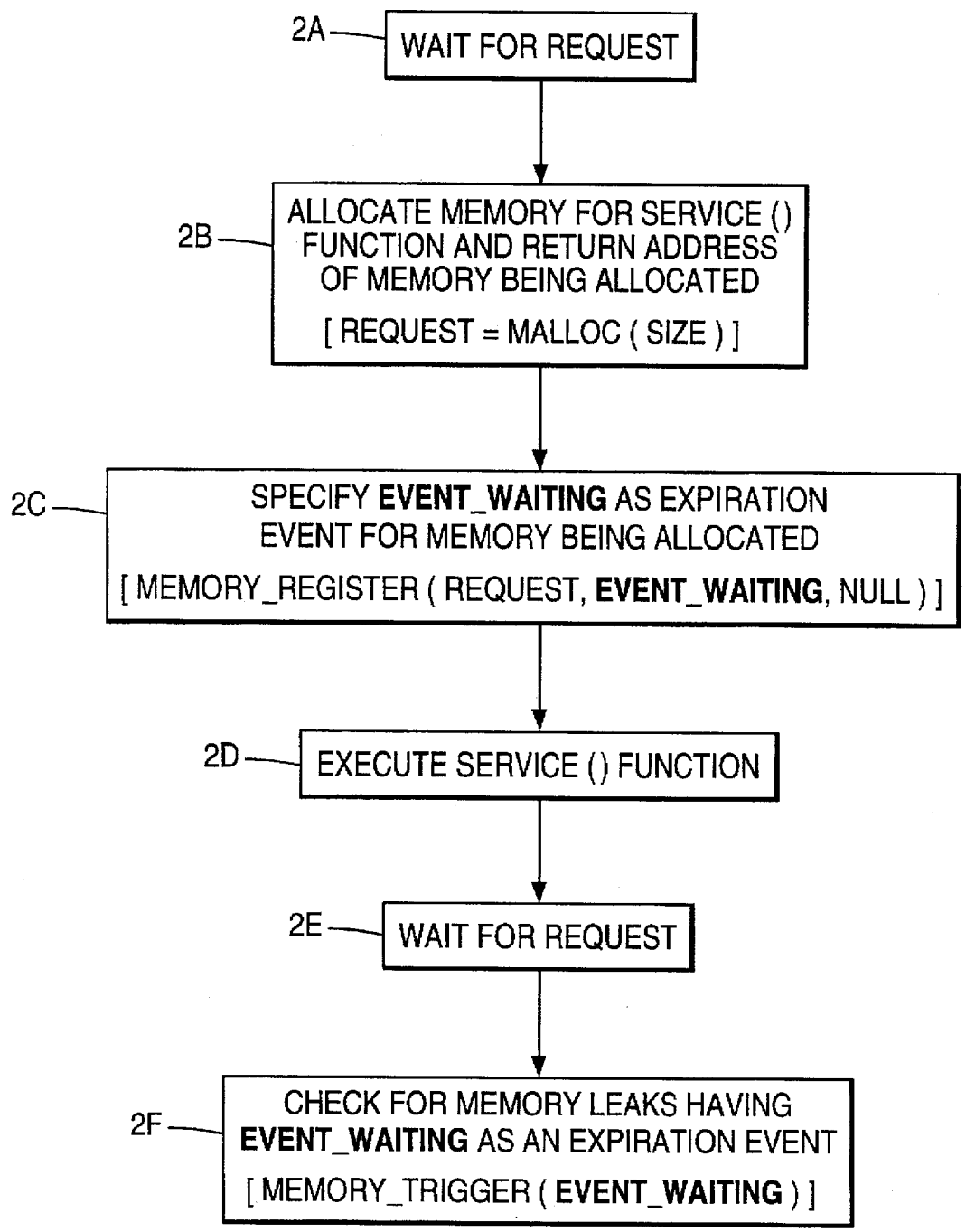
FIG. 2 depicts a flowchart for a detecting memory leaks in a program that waits for a user request, services the request with a function, and then waits for the next user request.

The memory_trigger() function of the present invention is strategically inserted within a program to indicate events when the events occur. Specifically, the memory_trigger() function is placed within the program at a location where the expiration event will occur. An example illustrating the use of the memory_trigger(expiration event) function to detect memory leaks is shown in FIG. 2. A flow diagram is shown in FIG. 2 for a program that does the following: waits for a user request, services the request with a function, and then waits for the next user request.

In step 2a, the program is waiting for the user to make a request. Upon receiving the request, in step 2b, the malloc() function allocates memory for a function referred to as "service()" (for processing the request) and returns an address of the memory being allocated. When the service() function finishes processing the request and returns the program to the waiting state, the memory allocated for the service() function should be de-allocated. The point where the program is returned to the waiting state is the de-allocation point. The state that the program is waiting for the user request is symbolically referred to as EVENT_WAITING, which has a defined numerical value, e.g., 12.

Step 2c specifies EVENT_WAITING as the expiration event for the memory allocated for the service() function. The service() function is executed in step 2d and the program is returned to the waiting state in step 2e triggering the occurrence of the expiration event EVENT_WAITING. Step 2f executes the memory_trigger() function to check whether the memory allocated for the service() function was de-allocated. The memory allocation table is referenced by the memory management functions for memory allocations having an expiration event equal to the numerical value assigned to the symbolic name EVENT_WAITING. A list of filenames and line numbers corresponding to memory allocations matching the aforementioned criteria is returned.

The free() function of the present invention is a variation of the well-known UNIX free() function. Like the UNIX free(pointer) function, the free(pointer) function of the present invention instructs the memory management functions to return an area of previously dynamically allocated memory, as denoted by "pointer," to the pool of unused memory. Additionally, prior to de-allocating the memory allocation referred to by the "pointer," the free() function of the present invention instructs the memory management functions to reference the memory allocation table to determine whether there are any memory allocations that are dependent upon the memory allocation referred to by the "pointer" which is about to be de-allocated. Any such memory allocations found are memory leaks. In the preferred embodiment of the present invention, the free() function also logs as memory leaks the list of the memory allocations dependent upon the memory allocation which is about to be de-allocated.

Example 3 depicts pseudo code for implementing the free() function of the present invention to detect memory leaks of the situation depicted back in FIG. 3.

---

\\Example 3

| 81 | USER_33=memory_malloc(size1, EVENT_NONE, NULL) |
| 82 | USER_NAME_34=memory_malloc(size2, EVENT_NONE, USER_33) |
| 83 | free(USER_33) |

---

Referring to example 3 and FIG. 3, line 81 allocates "size1" bytes of memory for the LOGON structure 31 and returns the pointer USER_33. Line 82 allocates "size2" bytes of memory for the NAME structure 32, specifies the memory being allocated as dependent upon the memory allocation referred to by the pointer USER_33, i.e., memory allocation for the LOGON structure 31, and returns the pointer USER_NAME_34. Line 83 implements the free() function of the present invention to determine whether there are any memory allocations dependent upon the memory allocation referred to by the pointer USER_33, i.e., memory allocation for the LOGON 31 structure, which is about to be de-allocated. The free() function of the present invention would then de-allocate the memory as the standard UNIX memory management free() function does. Since the memory allocation for the NAME structure 32 has not yet been de-allocated, the free() function of the present invention will detect the memory allocation for the NAME structure 32 pointed to by USER_NAME_34 in the memory allocation table as a memory leak.

Although the present invention has been described in considerable detail with reference to a certain preferred operating system, other operating systems are also applicable. Therefore, the spirit and scope of the appended claims should not be limited to the description of the preferred operating system contained herein.

I claim:

1. A method for detecting memory leaks in a program executing on a computer system using memory management functions, said memory management functions operative to query and maintain a memory allocation table for storing information regarding currently allocated blocks of computer memory in said computer system including corresponding requesting file information and de-allocation information, said method comprising the steps of:

allocating a block of computer memory for a function in said program requesting said block of computer memory, said function being a basic programming unit of said program;

specifying said de-allocation information for said block of computer memory being allocated, said de-allocation information indicative of when said currently allocated blocks of computer memory should be de-allocated, wherein the step of specifying said de-allocation information for said block of computer memory being allocated includes specifying an expiration event for said block of computer memory being allocated, said expiration event being an occurrence indicative of when said block of computer memory should be de-allocated, and assigning a unique numerical values as said expiration event in said memory allocation table, said unique numerical value indicative of a type of said expiration event, said type of expiration event includes an expiration event where an expiration should never occur;

storing said requesting file information and de-allocation information corresponding to said function requesting said block of computer memory in said memory allocation table using said memory management functions, querying said memory allocation table using said memory management functions for said currently allocated blocks of computer memory having de-allocation events thereby indicating corresponding said currently allocated blocks of computer memory should have been de-allocated.

2. The method recited in claim 1 wherein the step of querying said memory allocation table includes:

searching said memory allocation table using said memory management functions for said currently allocated blocks of computer memory having predetermined one or more said expiration events.

3. The method of claim 1, wherein said requesting file information includes filenames and line numbers indicative of where the request was made for said currently allocated blocks of computer memory.

4. The method recited in claim 1 wherein the step of specifying said de-allocation information for said block of computer memory being allocated includes:

specifying a dependent pointer for said block of computer memory being allocated, said dependent pointer operable to point to a currently allocated block of computer memory, said dependent pointer indicating that said block of computer memory being allocated should be de-allocated prior to de-allocation of said currently allocated block of computer memory referred to by said dependent pointer.

5. The method recited in claim 4 wherein the step of querying said memory allocation table includes:

searching said memory allocation table using said memory management functions for said currently allocated blocks of computer memory having said dependent pointers pointing to said currently allocated blocks of computer memory about to be de-allocated.

6. The method recited in claim 1 comprising the additional step of:

listing said filenames and line numbers of said currently allocated blocks of computer memory corresponding to said currently allocated blocks of computer memory found in said memory allocation table subsequent to said step of querying.

7. The method recited in claim 1 wherein the step of allocating said computer memory includes:

returning an address of said block of computer memory being allocated to said program executing on said computer system.

8. The method recited in claim 1 wherein said memory management functions are selected from the group consisting of malloc(), memory_trigger(), memory_register(), free(), calloc(), realloc(), memory_malloc() and memory_calloc().

9. The method as recited in claim 1 wherein said type of expiration event further includes an expiration event where memory allocations are associated only with dependent pointers.

10. An apparatus for detecting memory leaks in a program executing on a computer system having blocks of computer memory, wherein said program comprise at least one function, said apparatus comprising of:

a virtual memory manager for allocating blocks of computer memory for said functions requesting said blocks of computer memory;

a memory allocation table operative to store requesting file information and de-allocation information corresponding to currently allocated blocks of computer memory, said de-allocation information indicative of when said currently allocated blocks of computer memory should be de-allocated;

means for specifying de-allocation information for said blocks of computer memory being allocated in said memory allocation table, wherein said means for specifying de-allocation information includes means for specifying expiration events in said memory allocation table for said blocks of computer memory being allocated, said expiration events being occurrences that indicate when said blocks of computer memory should have been de-allocated, and means for assigning a unique numerical values as said expiration event in said memory allocation table, said unique numerical value indicative of a type of said expiration event, said type of expiration event includes an expiration event where an expiration should never occur; and debugging memory management means for querying said memory allocation table for said currently allocated blocks of computer memory having de-allocation events indicating corresponding said currently allocated blocks of computer memory should have been de-allocated.

11. The apparatus recited in claim 10 wherein said debugging memory management means for querying said memory allocation table includes:

means for searching said memory allocation table for said currently allocated blocks of computer memory having predetermined one or more said expiration events.

12. The apparatus recited in claim 10 wherein said means for specifying de-allocation information includes:

means for specifying dependent pointers for said blocks of computer memory being allocated, said dependent pointers operable to point to currently allocated blocks of computer memory indicating that said blocks of computer memory being allocated should be de-allocated prior to de-allocation of said currently allocated blocks of computer memory referred to by said dependent pointers.

13. The apparatus recited in claim 12 wherein said debugging memory management means for querying said memory allocation table includes:

means for searching said memory allocation table for said currently allocated blocks of computer memory having said dependent pointers pointing to said currently allocated blocks of memory to be de-allocated.

14. The apparatus recited in claim 10 wherein said virtual memory manager includes:

means for returning addresses of said blocks of computer memory being allocated by said virtual memory manager to said programs executing on said computer system.

15. The apparatus of claim 10, wherein said requesting file information includes filenames and line numbers indicative of where the request was made for said currently allocated blocks of computer memory.

16. The apparatus recited in claim 10 further comprising of:

means for listing said filenames and line numbers of said currently allocated blocks of computer memory corresponding to said currently allocated blocks of computer memory found by said debugging memory management means when querying said memory allocation table.

17. The apparatus as recited in claim 10 wherein said type of expiration event further includes an expiration event where memory allocations are associated only with dependent pointers.

* * * * *